US011790007B2

(12) United States Patent
Saxena et al.

(10) Patent No.: US 11,790,007 B2
(45) Date of Patent: Oct. 17, 2023

(54) CONDUCTING A REPETITIVE SEARCH INCLUDING DIFFERENCE DETERMINATION

(71) Applicants: Dhruv Saxena, Fremont, CA (US); Yash Mandhani, Hayward, CA (US)

(72) Inventors: Dhruv Saxena, Fremont, CA (US); Yash Mandhani, Hayward, CA (US)

(*) Notice: Subject to any disclaimer, the term of this patent is extended or adjusted under 35 U.S.C. 154(b) by 154 days.

(21) Appl. No.: 17/531,492

(22) Filed: Nov. 19, 2021

(65) Prior Publication Data

US 2022/0164391 A1 May 26, 2022

Related U.S. Application Data

(60) Provisional application No. 63/116,217, filed on Nov. 20, 2020.

(51) Int. Cl.
*G06F 16/00* (2019.01)
*G06F 16/9035* (2019.01)
*G06F 16/903* (2019.01)

(52) U.S. Cl.
CPC .... *G06F 16/9035* (2019.01); *G06F 16/90335* (2019.01)

(58) Field of Classification Search
CPC ................................ G06F 16/90335
See application file for complete search history.

(56) References Cited

U.S. PATENT DOCUMENTS

2008/0222140 A1\* 9/2008 Lagad .................. G06F 16/951
707/999.005

\* cited by examiner

*Primary Examiner* — Ajith Jacob
(74) *Attorney, Agent, or Firm* — Grandview Law

(57) ABSTRACT

Computer-implemented systems and methods for repetitively performing a search. The methods include receiving a search query that includes one or more search parameters including one or more search terms. A search may be repetitively performed to produce a plurality of search results at different points in time, each performed search being based, at least in part, on the one or more search parameters included in the search query. A determination may be made for one or more of the search results whether there is a difference between each of the one or more of the search results and a preceding search result and presenting the one or more of the search results including identifying one or more differences between each of the one or more of the search results and a preceding search result if there are any differences.

31 Claims, 10 Drawing Sheets

202 Receive a search query that includes one or more search parameters including one or more search terms

203 Form a search parameter set that defines one or more parameters for a search to be repetitively performed and saving the search parameter set, the saved search parameter set includes the one or more search parameters of the search query and activatable for defining one or more parameters of a search

204 Perform repetitively a search to produce a plurality of search results at different points in time, each performed search being based, at least in part, on the one or more search parameters included in the search query

206 Determine for one or more of the search results whether there is a difference between each of the one or more of the search results and a preceding search result

208 Present the one or more of the search results including identifying one or more differences between each of the one or more of the search results and a preceding search result if there are any differences

302 Generate a plurality of search results of a plurality of research users

304 Filtering out one or more hits of at least a subset of the search results, the one or more hits to be filtered out being selected for filtering by an administrator user 306 Presenting the at least a subset of the search results to computing devices of the research users

402 Receive a search query that includes one or more search parameters including one or more search terms

404 Perform repetitively a search to produce a plurality of search results at different points in time, each performed search being based, at least in part, on the one or more search parameters included in the search query

406 Determine for one or more of the search results whether there is a difference between each of the one or more of the search results and a preceding search result

408 Present the one or more of the search results including identifying one or more differences between each of the one or more of the search results and a preceding search result if there are any differences

412 Generate a plurality of additional search results of a plurality of research users

414 Filtering out one or more hits of at least a subset of the additional search results, the one or more hits to be filtered out being selected for filtering by an administrator user

416 Presenting the at least a subset of the additional search results to computing devices of the research users

CONDUCTING A REPETITIVE SEARCH INCLUDING DIFFERENCE DETERMINATION

CROSS REFERENCE TO RELATED APPLICATION(S)

This application claims priority to U.S. Provisional Patent Application Ser. No. 63/116,217, filed on Nov. 20, 2020, which is incorporated herein by reference in its entirety.

BACKGROUND

1. Field of the Invention

The present invention relates to computer searches, and more specifically, to systems and methods for conducting online computer searches repetitively.

2. Description of Related Art

Individuals, including those in academia such as students and researchers, as well as simply curious individuals, are often involve in research projects that could last for extended periods of time. For example, students of all levels, are commonly given research projects to do that can last an entire semester or a year. One of the most useful tools for conducting research are search engines such as GOOGLE, YAHOO, MICROSOFT BING, and so forth.

One of the big drawbacks of conducting a comprehensive research project using such search engines is that they typically perform a search that is a one-time act that only takes a snapshot of what is available and relevant online at the time the search engine is utilized. However, online information is continually being updated and/or created via websites, blogs, research papers, and so forth. Thus, if an online search is conducted only once, new information created/published later will not be uncovered and realized by the online researcher.

BRIEF DESCRIPTION OF THE DRAWINGS

FIG. 2B is a flowchart of another example process for repetitively performing a search using the same one or more search parameters according to various embodiments.

FIG. 3 is a flow chart of an example process for filtering out hits of a plurality of search results generated for a plurality of research users according to various embodiments according to some embodiments.

FIG. 4 is a flow chart of an example process for repetitively performing a search using the same one or more search parameters and for filtering out hits of a plurality of search results generated for a plurality of research users according to according to some embodiments.

DETAILED DESCRIPTION

Figure 1A:
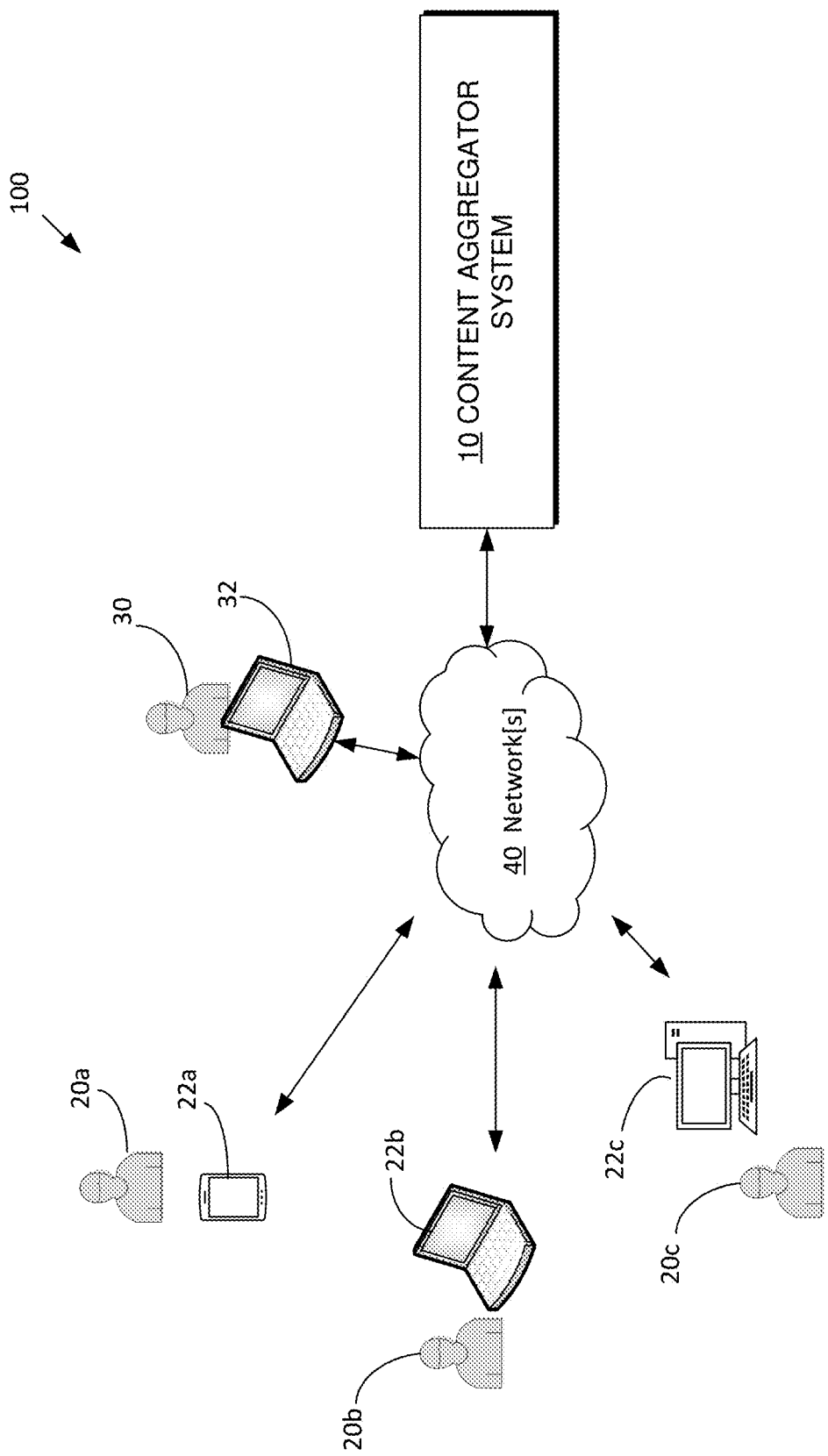
FIG. 1A is a high-level block diagram of a network environment according to some embodiments.

In the following description, certain specific details are set forth in order to provide a thorough understanding of various embodiments of the disclosure. However, upon reviewing this disclosure one skilled in the art will understand that the disclosure may be practiced without many of these details. In other instances, well-known structures/apparatus, systems and methods associated with computers, wireless devices, networks/cloud-based computing, and SaaS, have not been described in detail to avoid unnecessarily obscuring the descriptions of the embodiments of the disclosure.

Throughout various portions of the following description, the embodiments of the present disclosure are described in the context of application to specific examples as presented. However, these examples are not intended to be limited unless otherwise expressly stated. As will be understood by one skilled in the art after reviewing this disclosure, various embodiments of the present disclosure may have a wide variety of applications in other contexts and fields.

The term, computer readable medium or media, does not include "transitory waves or signals."

The drawings submitted herewith include example information depicted for illustrative purposes and are not intended to be limiting unless otherwise indicated.

According to various embodiments of the present disclosure, computer implemented systems and methods are disclosed herein for receiving a search query that includes one or more search parameters including one or more search terms. In some cases, the received search query may include other information such as a search topic, and a time span or a termination time for ending a search that is repetitively performed based on the same one or more search parameters (e.g., search terms, source preferences, content author preferences, exclusion terms, and so forth). For the embodiments, the systems and methods in response to receiving the search query may automatically and repetitively perform a search to produce a plurality of search results at different points in time, where each performed search being based, at least in part, on the one or more search parameters included in the search query. In various embodiments, for one or more of the search results (e.g., a subset or all of the search results produced) a determination may be made as to whether there is a difference between each of the one or more of the search results and a preceding search result. Note that for purposes of the following, the term "preceding search result" should be broadly construed and may be in reference to any prior or previous search result and is not necessarily limited to an immediately preceding search result unless indicated otherwise. The one or more of the search results may then be presented (e.g., transmitting to a user device or caused to be displayed on a user device) including identifying one or more differences between each of the one or more search of the results and a preceding search result if there are any differences.

In various embodiments, these operations may be implemented by a content aggregator system. As will be further described herein, a content aggregator system may be implemented by a single computing device (e.g., a server or a workstation) executing computer readable instructions. Alternatively, the content aggregator system may be implemented in the cloud, for example, implemented by a plurality of computing devices (e.g., servers) employing dedicated circuitry (e.g., application specific integrated circuit or ASIC) and/or programmable circuitry (processors, controllers, FPGA, or the like) executing computer readable instructions.

The content aggregator systems and methods to be described herein facilitate a user to conduct, for example, an online research project for an extended period of time by repetitively performing a search over and over again using the same search parameters. When new "hits" or new online content is found, the systems and methods may identify the new hits or content. In some cases, the repetitive search may be performed at regular time intervals, at predefined points in time (e.g., daily at 9 AM and 7 PM), or randomly based on non-temporal factors such as the location of a user's mobile computing device. For example, a search may be prompted when the user who requested the repetitive search relocates to a new geographical location (while, for example, carrying a mobile computing device with a GPS). For example, if the repetitive search that is being conducted seeks out conferences and meetups for a particular topic, then when the mobile computing device of the user is detected as relocating beyond a certain distance from, for example, a home location, then that may cause the content aggregator systems and methods to conduct a new search to find any conferences or meetups that did not appear in a previous search result while the user was at his or her home location. These and other features of the content aggregator systems and methods will be described in the following.

To facilitate understanding of the systems and methods to be described herein, the following terms are introduced:

Research User—A user such as a student or any other person researching any topic of interest.

Administrator User—A user, such as a teacher, who may provide search parameters as well provide feedback to one or more research users. An administrator user may also be permitted to add or delete search hits (e.g., websites or online content that meets one or more search parameter) included in a search result provided by, for example, the content aggregator systems and methods, and to annotate a search result.

Search—a computer search such as an online search.

Search Query—a query submitted by, for example, a research user or an administrator user that may identify a search topic and one or more additional search parameters including, one or more keywords (e.g., search terms), exclusion term[s] (e.g., for filtering out websites or content that include the exclude term or terms), geographical location[s] (e.g., identifying one or more geographical so that searches seeks out content or sources that originate or is associated with the one or more identified geographical locations or nearby locations), source restrictions (e.g., restrictions on accessing certain websites), term exclusion[s] (e.g., filtering out hits such as websites that include excluded terms), favorable sources or content authors, and so forth.

Search Parameter Set—a set of one or more search parameters for conducting a search repetitively. A search parameter set may include search parameters as provided by a research user through a search query, one or more parameters as set forth in a user profile of the research user, and one or more search parameters provided by an administrator user. Multiple search parameter sets may be created and saved for different topics and may be selectively activated or deactivated by the research user (or by an administrator user). Each search parameter set may be assigned a "topic" name for identification. For example, when a research user submits a search query that prompts the generation of a search parameter set, the "topic" indicated by the research user in the search query may be used as the name or identifier for the generated search parameter set. That is, since a research user may maintain multiple search parameter sets for conducting different searches and that can be selectively activated or deactivated the topic names of each generated search parameter set may be an easy way to distinguish the different search parameter sets maintained by the research user.

Repetitive Search—a search that is repetitively performed using the same search parameter set.

Search result—the findings of a single computer search. Each search result may include representations of "hits" that may be listed according to relevancy. Each hit is a website or online content that at least partially meets search parameters of a search and may be represented by a title, a link that points to a webpage, and/or a description or content showing where search terms appear.

Hit—A website or online content, for example, that may at least partially meet one or more search parameters of a search. For example, a search result may include a list of hits (e.g., websites, online white papers, published articles, blogs, online videos, podcasts, etc.) that may at least partially meet the one or more search parameters of the search.

Referring now to FIG. 1A, which is a high-level block diagram of a network environment 100 according to various embodiments. As illustrated, the network environment 100 includes a content aggregator system 10 that may be in communication with a user computing device 32 of a project administrator 30 and user computing devices 22*a*, 22*b*, and 22*c* of research users 20*a*, 20*b*, and 20*c*, respectively, via one or more networks 40 (e.g., one or more wireless and/or wired networks, which may include one or more of, for example, a cellular and/or data network, a wireless local area network (WLAN), a local area network (LAN), a personal area network (PAN), and so forth). In various embodiments, the user computing devices 22*a*, 22*b*, and 22*c* may have different form factors. For example, in FIG. 1A, user computing device 22*a* is illustrated as being a mobile device, user computing device 22*b* is illustrated as being a laptop computer, and user computing device 22*c* is illustrated as being a desktop computer or workstation. In various embodiments, a client application may be installed on each of the user computing devices 22*a*, 22*b*, and 22*c* to facilitate communication with the content aggregator system 10.

In the following, "*" represents a wildcard. Thus, references in the following description to, for example, "user computing device 22*" may be in reference to user computing device 22*a*, user computing device 22*b*, or user computing device 22*c* of FIG. 1A. For ease of explanation and illustration, only three research users 20* (with their user computing devices 22*) and a single administrator user 30 (with the single computing device 30 of the administrator user 30) are illustrated. However, and as will be appreciated by those of ordinary skill in the art, such a network environment 100 may include more than three research users 20* (and their user computing devices) and more than a single administrator user 30 and his or her user computing device 32 in various alternative embodiments.

In various embodiments, the content aggregator system 10 may be implemented by a single network device (e.g., a server or a workstation). Alternatively, the content aggregator system 10 may be a cloud-based system employing a plurality of network computing devices such as one or more servers, datastores, and so forth. For the embodiments, the content aggregator system 10 may automatically conduct repetitively, for each research user 20*, a search at different points in time for a particular topic using the same search parameter set (e.g., a set of search parameters such as search terms, exclusion terms, source preference, location preference, authorship preference, etc.) that may be specific to that user and to that search topic. For example, suppose research users 20* are students who are each doing semester long research projects for a class taught by administrator user 30 (e.g., class teacher). Since this is a semester long project, the administrator user 30 asks the research users 20* to employ the content aggregator system 10 to conduct the same search using the same search parameters over and over again during the course of the semester to find the most updated information on the internet. That is, information available through the Internet is very dynamically as new content, as well as updates of previously posted information/content are constantly being posted.

In order to provide support and guidance to the research activities of the research users 20* using the content aggregator system 10, the administrator user 30 (via the user computing device 32) may provide to the content aggregator system 10 search parameters that may be applied to the repetitive searches conducted by the content aggregator system 10 on behalf of the research users 20*. That is, a search that is conducted repetitively by the content aggregator system 10 for a research user 20* may be conducted based on search parameters as set forth in a search query provided by the research user 20*, the user profile of the research user 20*, and/or one or more search parameters as set forth by the administrator user 30. As noted above the set of one or more search parameters to be used for conducting a repetitive search for a particular topic of a research user 20* will be referred to herein as a search parameter set. In various embodiments, such a search parameter set may be saved and retrieved by the content aggregator system 10 for conducting the same search repetitively over some specified time period or indefinitely. In some embodiments, and as will be described in greater detail herein, a search that is conducted on behalf of a research user 20* may be conducted when the research user 20* carrying his or her mobile computing device travels to a different location.

In some situations, there may not be an administrator user 30 associated with a research project being conducted by a research user 20*. For example, if a research user 20* is a scientist or a social researcher, or simply a layperson interested in conducting an independent long-term project, there may not be an administrator user 30 or even a time limit to complete the research project in which case the content aggregator system 10 may repetitively conduct the same search (e.g., using the same one or more search parameters) over and over again indefinitely until, for example, the research user 20* elects to end the repetitive search.

In some cases, information for a user profile of a research user 20* may be provide by the research user 20*, by an administrator user 30, or by another party. In various embodiments, a user profile may include, for example, the name of the research user 20*, their grade, location, school, and so forth. When a research user 20* wishes to have a search repetitively performed by the content aggregator system 10 using the same search parameters, the research user 20* may submit to the content aggregator system 10, via their user computing device 22*, a search query. In various embodiments, a search query may include one or more search parameters such as a search topic, search term[s], exclusion term[s], preferred online source[s] and/or website[s], preferred content author[s], search engine or engines to be used, preferred search engine or engines (e.g., if multiple search engines are used, results of preferred engines may be weighed heavier), indication as to when the repetitive search should end or cease, an indication as to how frequently will the repetitive search be performed, and/or other search parameters.

A search topic (or simply "topic") that may be defined in a search query may comprise of one or more words that may represent the topic to be searched. When a query includes a search topic, the submitted search topic may serve two purposes. First, it may be used as a search term or terms during repetitive searches, and second, it may be used as an identifier (e.g., title) for the search parameter set that specifies the search parameters for the search to be repetitively conducted (a search parameter set may include the search parameters defined in the search query as well as, in some cases, search parameters set forth in the user profile and/or as provided by an administrator user 30). That is, since the content aggregator system 10 allows a research user 20* to be able to maintain multiple search parameter sets for different research projects, assigning a search topic name to each search parameter set allows easy identification of each of the search parameter sets.

As briefly noted above, in some cases, some of the information included in a user profile of a research user 20* may be used as search parameters for a search to be repetitively conducted for the research user 20*. For example, a research user's address and school identified in the user profile may cause a search to be repetitively conducted for the research user 20* to seek, among other things, sources or content associated with the research user's school, or to a source in the geographic vicinity of the research user's location/address as indicated in the user profile.

In various embodiments, an administrator user 30 may provide one or more search parameters that may be applied to a search that is repetitively conducted for a research user 20*. Such parameters may include one or more of, for example, keyword filtering (to prevent research users 20* from searching for certain keywords), URL/domain filtering, author filtering, content source filtering, authorship filtering, and so forth.

In some embodiments, the submission of a search query to the content aggregator system 10 by a research user 20* via a user computing device 22* may initiate, or start a clock to initiate, a search to be repetitively conducted by the content aggregator system 10 during a predefined period of time (e.g., a week, a month, several months, etc.) or indefinitely. In various embodiments, the search to be repetitively conducted by the content aggregator system 10 may be executed at regular time intervals, at specific times, randomly or semi-randomly, or any other frequency as may be requested by, for example, the research user 20* or the administrator user 20*. Each time a search is performed by content aggregator system 10 using the same search parameter set, a search result may be generated. In various embodiments, a search result may identify hits (e.g., websites, online content, podcasts, blogs, video, etc.) that may meet one or more parameters of the search parameter set that was the basis for the search. In some cases, the search result may identify a hit by indicating a title (e.g., web site name or content title such as title of a published white paper, name of a podcast, invention title of a patent, etc.), a link, and a description of the hit (or a passage from the webpage or content that includes one or more search terms that was the basis for the search).

In various embodiments each search result that may be generated may be saved and as will be further described herein, and with the exception of the first search result, may be compared to a preceding search result that was generated from a search that was conducted earlier and that is based on the same search parameter set (note that such a comparison will not be done for the first search result since there will not be any preceding search result). If any changes are detected (e.g., detecting a new hit not previously identified in an earlier search result or detecting changes to the content of a previously identified hit) between for example, the most recent search result and a preceding search result, the content aggregator system 10 may alert the research user 20* and/or the administrator user 30 to the detected changes or differences. In some cases, this can be done by identifying or highlighting the detected changes or differences when the latest search result is presented to the research user 20* and/or the administrator user 30, or by automatically sending a notification about the detected changes or differences to the research user 20* and/or the administrator user 30. Note that the term "preceding search result" may be broadly construed and may be in reference to any search result that was generated earlier using the same search parameter set. For example, in some embodiments, the comparison of search results may only be made with respect to those search results that a research user 20* or an administrator user 30 elects to view. Thus, comparison can be made between the most recent search result that the research user 20* elected to view and a search result from several searches earlier.

To illustrate, suppose a search using the same search parameter set is repetitively and automatically performed ten times, each time generating a search result. In this example scenario, the research user 20* elects to only view the search results of the first, seventh, and tenth searches. When the research user 20* views the outcome of the seventh search, the content aggregator system 10 may only compare the search results of the first and seventh searches that the research user 20* elected to view to determine whether there are any differences between the two search results, and if there are any differences, may indicate the differences when the result of the seventh search is presented to the research user 20*. Similarly, when the research user 20* views the results of tenth search, the content aggregator system 10 may only compare the result of the seventh search with the result of the tenth search. As will be further described herein, various approaches may be employed to indicate the differences between two search results (e.g., highlighting or tagging representations of hits or content that were previously not found in previous searches).

In various embodiments, at least portions of a search result may be presented to a research user 20* when the content aggregator system 10 transmits such data to the research user's computing device 22*. For these embodiments, such data may also be transmitted to an administrator's computing device 32 so that the administrator user 30 can monitor the search results of the research user 20* and to allow the administrator user 20 to provide feedback and redirect or assist the research user 20* in their research activities. As will be further described herein, in some cases, an administrator user 30 may even be able to delete a portion or portions of a search result (or at least representations of hits of the search result) if the administrator user 30 had access to the search result before the research user 20* accessed the search result. For example, an administrator user 30 may be permitted to delete one or more hits of a search result (e.g., deleting at least one or more representations of the one or more hits in a search result graphical user interface that is displayed to the research user 20*) if for some reason the administrator user 30 disfavors those hits and prefers the research user 20* not to access those hits. In cases where a research user 20* has already accessed and viewed a search result and the administrator user 30 did not have an opportunity to delete representations of disfavored hits, the administrator user 30 may be able to tag or annotate the representations of those disfavored hits. Note that, an administrator user 30 may alternatively or additionally be able to tag or annotate representations of those hits that the administrator user 30 favors to direct the research user 20 towards the favored hits.

In various embodiments, the content aggregator system 10 may permit a search user 20* or an administrator user 30 to view representations of hits of a search result in an organized manner that facilitate easy digestion of the search result. For example, representations of the hits of a particular search may be presented in a way so that a user (e.g., a search user 20* or an administrator user 30) can selectively view groupings of representations of hits based on content types or type of information provided by the hits (e.g., experts, white papers, podcasts, online videos, etc.). For example, a user may elect to only view representations of hits associated with white papers or only representations of hits associated with podcasts.

Figure 7:
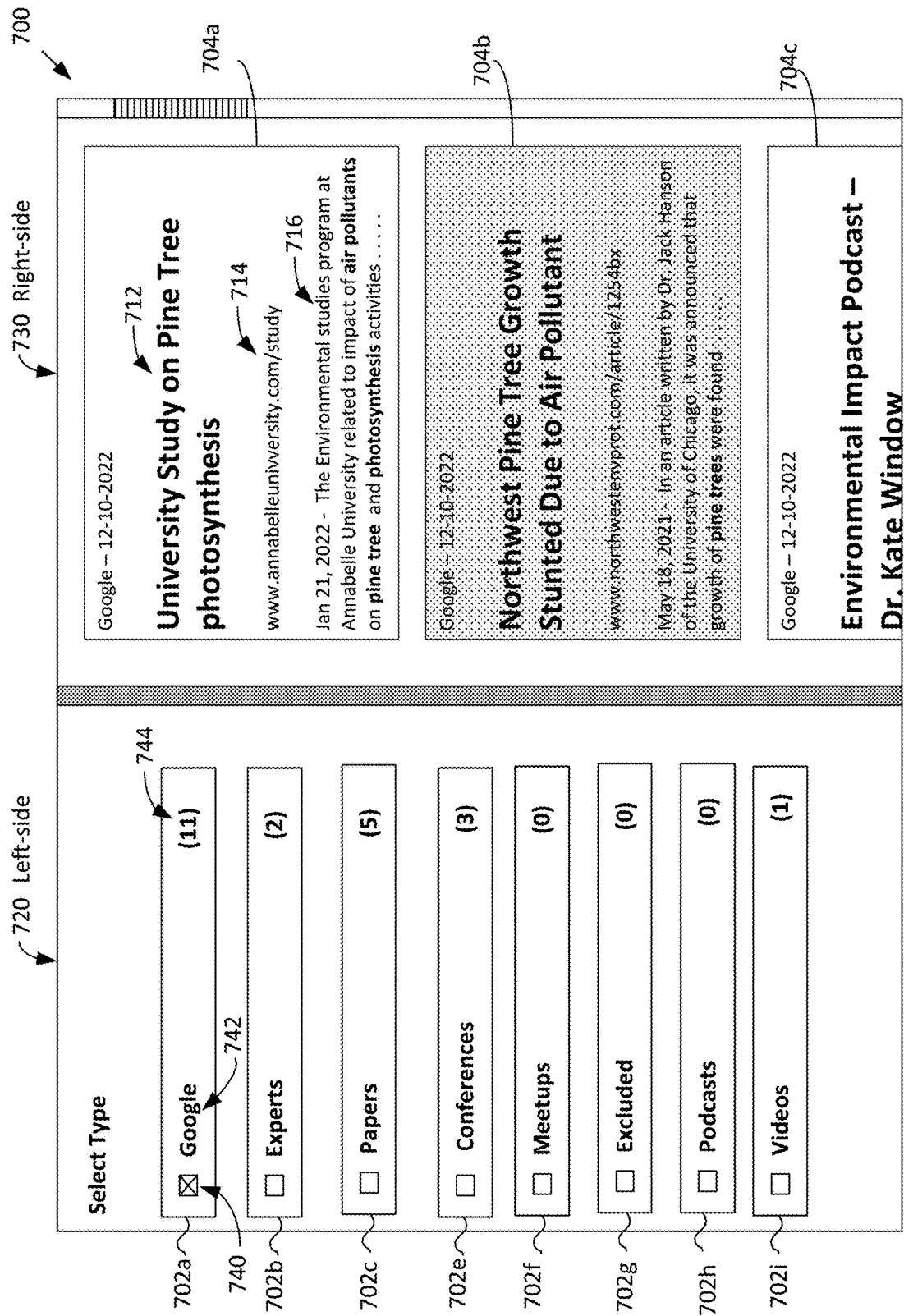
FIG. 7 illustrates an example instance of a graphical user interface for displaying at least a portion of a result of a search according to various embodiments.

Referring to FIG. 7, which illustrates an example instance of a graphical user interface for displaying at least a portion of a result of a search according to some embodiments. Through this graphical user interface (hereinafter "user interface") 700 a research user 20* or an administrator user 30 may elect to view representations of selective hits of a search result for easy digestion by the research user 20 or by the administrator user 30. In particular, the user interface 700 is divided to a left-side 720 and right-side 730. Through the left side 720, a research user 20* or an administrator user 30 may select only certain types of hits (or representations of the hits) of a search result to be displayed through the right-side 730. Note that both the left-side 720 and the right-side 730 may be scrollable so that all the listings on both sides of the user interface 700 may be viewable.

The left-side 720 includes blocks 702a, 702b, 702c, 702e, 702f, 702g, 702h, and 702i that can be used by a user (e.g., research user 20* or administrator user 30) to select the type of hits (or representations of the hits) to be displayed on the right-side 730. Each block 702* represents a type of hit to be represented through the right-side 720 if selected. Each block 702* includes a check box 740 for selecting that particular block, a description 742 of the hit type to be presented through the right-side 730, and a number 744 that indicates number of hits that were found for the hit type of the block 702*. For example, in FIG. 7, block 702a is for displaying hits (or representations of the hits) found using GOOGLE search engine. As shown, check box 740 for block 702a is shown as checked. Block 702a also shows by indication 744 that 11 hits were found using the GOOGLE search engine. In FIG. 7, representations of three of the hits found through GOOGLE are displayed on the right-side 730.

FIG. 7 further shows a block 702b that may be selected to show information associated with experts of the subject topic. For example, when block 702b is selected, the names of experts of the subject topic may be displayed on the right-side 730. If one of the experts displayed on the right-side 730 is selected, then a new window may be displayed that provides links to access articles or white papers authored by the selected expert. In some cases, the content aggregator system 10 may employ an expert finder search engine such as GOOGLE Expertise Finder, or other expert finders, to identify experts. As further illustrated in FIG. 7, other types of hits may be selectively presented by selecting papers (e.g., white papers) in block 702, conferences in block 702*e*, meetups in block 702*f*, excluded in block 702*g* (e.g., hits such as websites and online content that have been excluded from the search result because they include excluded terms), podcasts in block 702*h*, and videos in block 702*i*.

On the right-side 730 are representations 704*a*, 704*b*, and 704*c* of three of the hits of a search result (e.g., result of a GOOGLE search). Each representation 704*a*, 704*b*, and 704*c* may include a title 712 of the corresponding hit (e.g., website or content title), a link 714 (e.g., a hyperlink), and a description 716 of the content of the hit, which in some case, may be a passage from the hit that includes one or more search terms. Note that in FIG. 7, the search terms that were the basis of the corresponding search and that are found in the content of a hit are in bold.

In various embodiments, the hits of a search result may be listed according to the relevance of the hits. Relevance may be based on various factors including, for example, content match relevancy (e.g., how close does the content of the hit matches with the subject topic), temporal relevance (e.g., newer content is more relevant), search engine ranking, and so forth as will be further described herein. As noted previously, the content aggregator 10 may be designed to identify to a user (e.g., a research user 20* or an administrator user 30) those hits that were not previously found in a previous search, or to identify content of previously identified hits that have been changed (e.g., new content, or content that have been deleted or modified). For example, in FIG. 7 representation 704*b* is highlighted because the hit represented by representation 704*b* was not identified in a previous search, or because the hit although previously identified includes content that is new or that has been modified.

In alternative embodiments, rather than highlighting a representation 704* to indicate a new hit or changes to the content of the hit, the representation 704* may be tagged with a symbol (e.g., a flag) and/or annotated with comments from an administrator user 30. Note that one or more of the representations 704* may be annotated with other information such as an indication as to how many other users have accessed the hits represented by the one or more of the representations 704* (e.g., if research users 20* are classmates, then showing how many classmates have accessed a particular hit) and annotations of administrator user's comments.

Figure 1B:
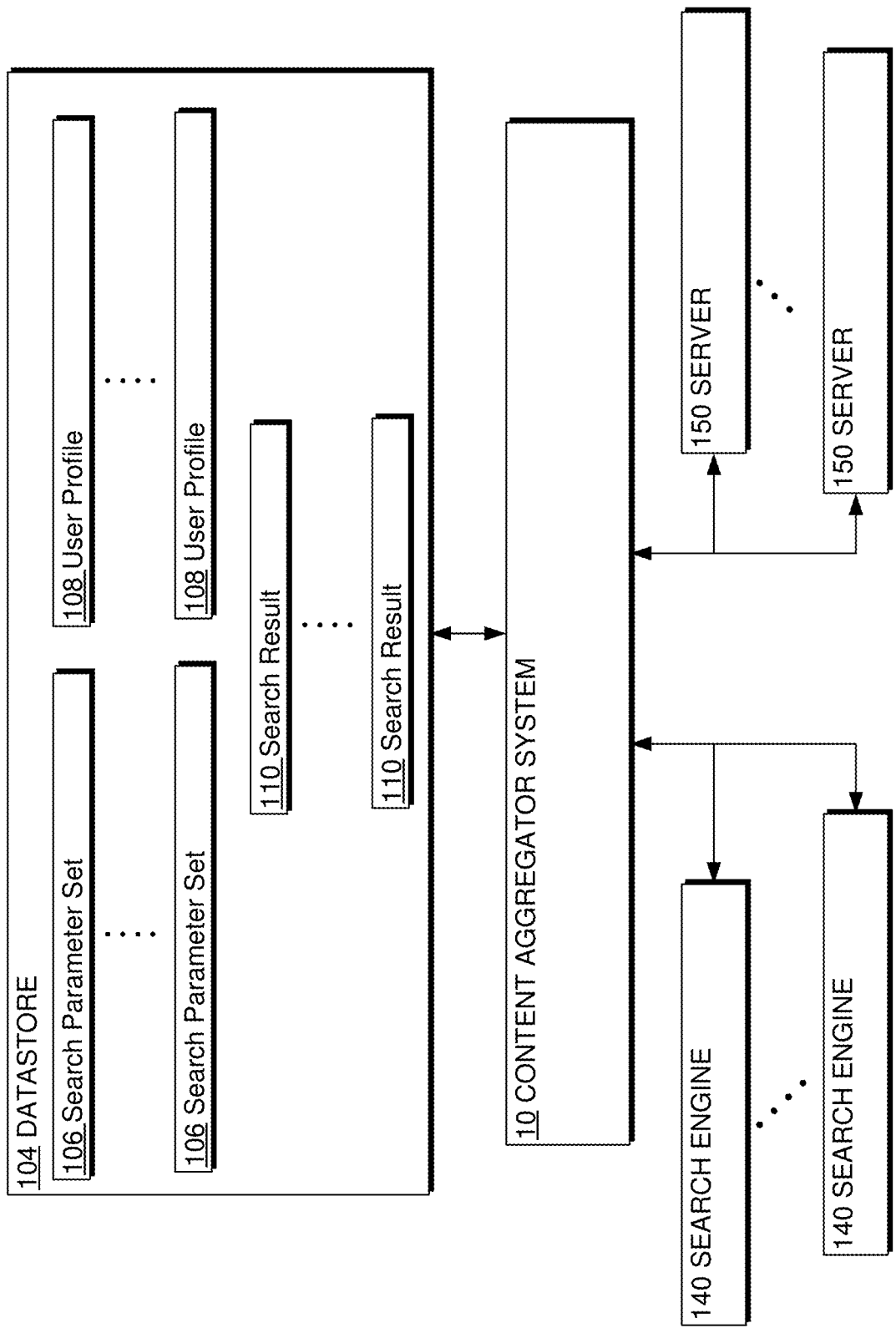
FIG. 1B illustrates a content aggregator system in communication with search engines and servers according to some embodiments.

Referring to FIG. 1B, which illustrates the content aggregator system 10 of FIG. 1A in communication with search engines 40, servers 50, and data store 104. Although not shown in FIG. 1B, the content aggregator system 10 may be in communication with the search engines 40, servers 50, and datastore 104 via one or more networks 40 of FIG. 1A. In various embodiments, the aggregator system 10 may employ one or more search engines 40 such as GOOGLE, YAHOO, MICROSOFT BING (as well as specialized search engines such as GOOGLE's Expertise Finder) to conduct a search repetitively using the same search parameters. The aggregator system 10 may also pull information from one or more servers 50 (e.g., web and/or content servers) when conducting the search repetitively and presenting the search results.

In various embodiments, the content aggregator system 10 may save/store various data in the datastore 104 including, for example, search parameter sets 106, user profiles 108, search results 110, and so forth. For these embodiments, each of the search parameter sets 106 that are stored in the datastore 104 may defined search parameters for a search that is repetitively conducted by the content aggregator system 10. As noted above, each repetitive search that is conducted by the content aggregator system 10 may be performed based on parameters as set forth in a search parameter set 106 and may generate a search result 110, which may also be saved into the datastore 104. In various embodiments, a search result 110 that is saved in the datastore 104 may additionally include annotations provided by an administrator user 30 with respect to hits, indication of differences between the search result 110 and a previous search result, information indicating access of one or more hits of the search result 110 by other research users (e.g., if a hit has been accessed by other research users, such as by classmates, then a representation of the hit may indicate how many other researchers accessed that hit and/or whether they liked it), and so forth.

Figure 2A:
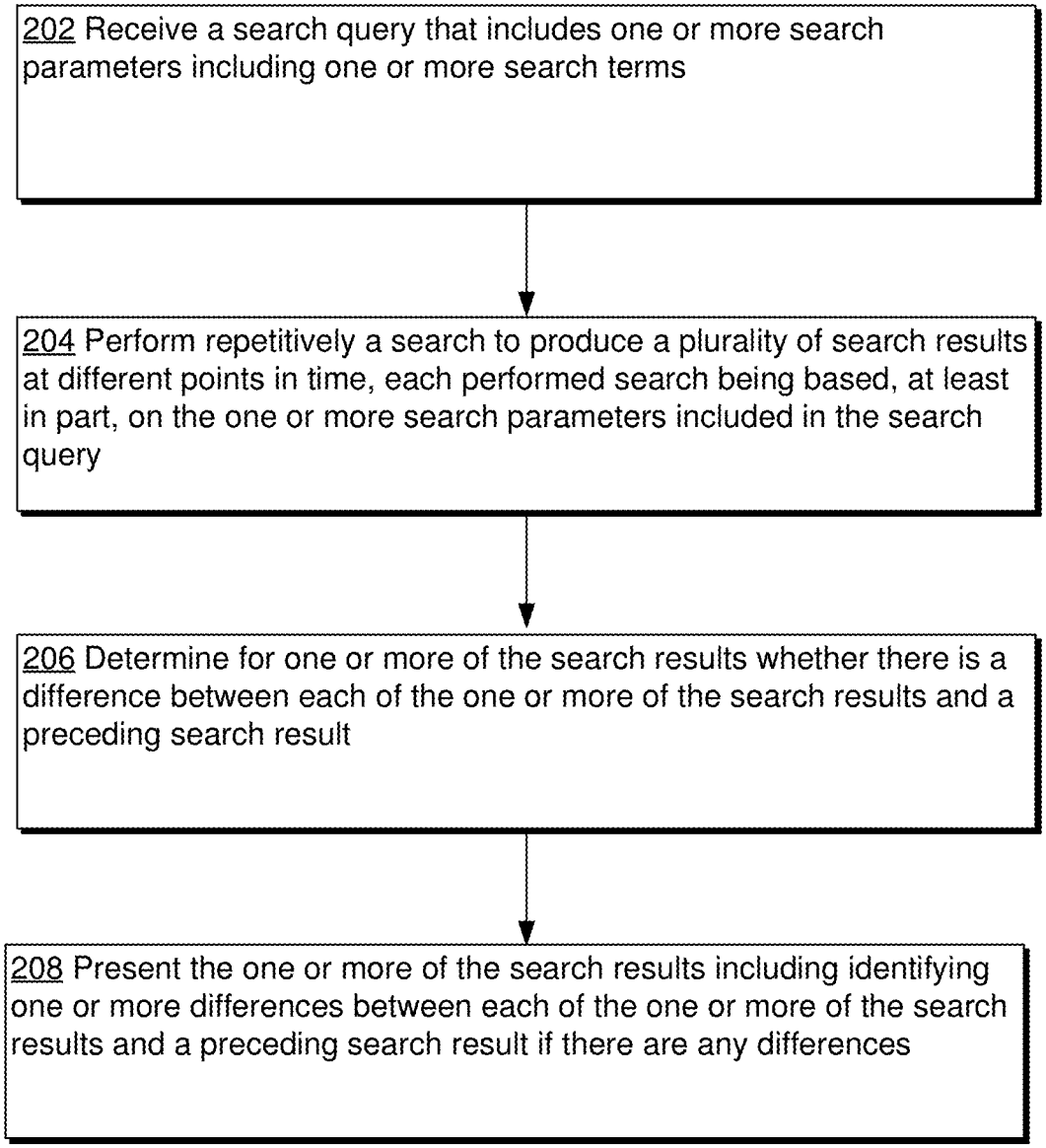
FIG. 2A is a flow chart of an example process for repetitively performing a search using the same one or more search parameters according to some embodiments.

FIG. 2A is a flowchart of an example process 200 for repetitively performing a search using the same one or more search parameters according to various embodiments. In some embodiments, at least some of the operations illustrated in FIG. 2A may be performed by the content aggregator system 10 of FIGS. 1A and 1B. For ease of illustration and in order to facilitate understanding of process 200, the following discussion of process 200 will reference the systems and features illustrated in FIGS. 1A, 1B, and 7. However, those of ordinary skill in the art will recognize that process 200 may be implemented using systems and features other than those illustrated in FIGS. 1A, 1B, and 7.

The example process 200 may begin at 202 when a search query is received that includes one or more search parameters including one or more search terms. For example, the content aggregator system 10 of FIGS. 1A and 1B receiving a search query that includes one or more search parameters including one or more search terms. In addition to the one or more search terms, other types of search parameters may be included in the search query including, for example, exclusion term[s], preferred source[s] or website[s], preferred content author[s], search engine or engines to be used, preferred search engine or engines, and so forth. For the embodiments, the search query may also include a search topic (which may serve as a search parameter as well as an identifier or name for a search parameter set to be formed based, at least in part, on the search parameters indicated in the search query) and an indication as to when the repetitive performance of the search is to be completed or cease, an indication as to how frequently will the search be repetitively performed, and/or other search parameters. The indication as to when the repetitive performances of the search should complete may be accomplished in a number of ways including by indicating an end date, an overall time interval, or the number of repetitive search to be performed for a fixed time interval.

In various embodiments, the search query may be received from a computing device 22* of a research user 20*, from a computing device 32 of an administrator user 30, or from a computing device of some other party.

At 204 a search is repetitively performed to produce a plurality of search results at different points in time, each performed search being based, at least in part, on the one or more search parameters included in the search query. For example, the content aggregator system 10 of FIGS. 1A and 1B repetitively performing a search (e.g., online or Internet search) to produce a plurality of search results at different points in time, each performed search being based, at least in part, on the one or more search parameters included in the search query. In some embodiments, the search query that may be received may be provided by a research user 20* via a first computing device (e.g., user computing device 22*) and the search that is repetitively performed is based, at least in part, on one or more search parameters provided by an administrator user 30 via a second computing device (e.g., user computing device 32). For these embodiments, the search that is repetitively performed is based, at least in part, on a user profile 108 of the research user 20*.

In various embodiments, the search that is repetitively performed is performed by repetitively performing a search using a plurality of search engines 140 (e.g., GOOGLE, BING, YAHOO, etc.) to find, for example, websites and/or online content that meets at least one of the one or more search parameters of the search query. In some cases, the search that is repetitively performed is performed at predefined time intervals or at specified times such as at specific daily times. For example, performing a repetitive search every 12 hours, or at 8 AM and 6 PM every day. In some cases, the search that is repeatedly performed is repetitively performed within a predefined time span (e.g., all of the searches being performed within three weeks, five months, and so forth) as defined, for example, by the research user 20* or by the administrator user 30.

In embodiments where the search query is provided by a research user 20* one or more of the searches that are repetitively performed may be initiated based on detected movement or location (e.g., via GPS) of a computing device 22* associated with the research user 20*. For these embodiments, the one or more of the searches that are repetitively performed may be initiated in response to a determination that the computing device 22* has relocated beyond a predefined distance from a previous location of the computing device 22*. In some cases, the plurality of search results that are generated by the repetitive performance of a search may be stored (e.g., stored or saved into a datastore or other types of memory/storage).

Referring back to process 200 of FIG. 2A, at 206 a determination made be made for one or more of the search results whether there is a difference between each of the one or more of the search results and a preceding search result. For example, the content aggregator system 10 of FIGS. 1A and 1B determining for one or more of the search results that were produced from performing the search repetitively whether there is a difference between each of the one or more of the search results and a preceding search result. For instances, suppose a search is repetitively performed 14 times for a research user 20* using the same search parameters. Suppose further that the research user 20* elects to access the results of only the first, fifth, and fourteenth searches, then in some embodiments, the content aggregator system 10 may only determine whether there is any difference between the results of the first, fifth, and fourteenth searches that the research user 20* elected to view. That is, when the research user 20* elects to view the result of the fifth search, the content aggregator system 10 in some cases, may automatically compare the result of the fifth search with the result of the first search to determine whether there are any differences between the two search results, and if there are any differences then the content aggregator system 10 may indicate the differences when the fifth result is presented (e.g., tagging or highlighting new hits or content when the fifth result is presented). Similarly when the research user 20* elects to view the result of the fourteenth search, the content aggregator system may automatically compare the result of the fourteenth search to the result of the fifth search to determine whether there are any differences between the two search results, and if there are any differences then the content aggregator system 10 may indicate the differences when the result of the fourteenth search is presented.

In some embodiments, the determination as to whether there is a difference between each of the one or more of the search results and a preceding search result may involve determining whether there is a difference between a search result and an immediately preceding search result. For example, in the above example, comparing the result of the fifth search with the result of the fourth search to determine the differences between the two searches. In one embodiment, each search result that is generated may be compared to an immediately preceding search result to determine whether there is a difference between each search result and an immediately preceding search result. For example, comparing a second search result that was generated to a first search result that was generated to determine whether there is a difference between the first search result and the second search result, then comparing a third search result with the second search result to determine whether there is a difference between the second search result and the third search result, and so forth.

In various embodiments, each of the one or more of the search results may include information identifying a plurality of hits that at least partly meets the one or more search parameters of the search query. For these embodiments, each hit may represent a specific website or online content (e.g., white paper, article, video, audio file, etc.). In some cases, the plurality of hits may be ranked, by the content aggregator system 10, according to one or more relevancy factors including content match relevancy, temporal relevancy, search engine rankings (e.g., is the hit ranked high on GOOGLE), prestige/source reliability, content author relevancy, and/or user preferences. For these embodiments, content match relevancy may be in reference to how frequent are search terms appearing in the content or how related is the content to the search topic. Temporal relevancy, in contrast, relates to temporal aspects of the hits. For example, newer content or pages are given more weight than older pages or content. Prestige/source reliability relates to identifying those sources that have traditionally been reliable. For example, edu, .gov, etc. may be ranked higher than .com and blog pages. Popular and well-known sites (such as history.com or Merriam-websters) may also be ranked higher. Content author relevancy relates to, for example, whether an author of the content can be verified as an expert on the topic based on credentials, institute affiliation, number of works published, and user provided information.)—there are currently various online sites that finds experts in specific fields such as GOOGLE Expertise Finder (expertisefinder.com), ProNet (https://profnet.prnewswire.com/), and MICROSOFT Academic Search. User preferences relates to, for example, user preference for certain websites including paid for services or sites favored by the user, may be given more weight, or websites that are given higher ratings by other users may be given greater weight.

In various embodiments, each of the one or more of the search results provided by the content aggregator system 10 may include information that indicates at least a title and a uniform resource locator (URL) for each of the hits identified by each of the one or more of the search results. In some embodiments, the determination as to whether there is a difference between each of the one or more of the search results and a preceding search result may involve comparing, by the content aggregator system 10, the hits of each of the one or more of the search results with the hits of a preceding search result to determine whether there is a difference between each of the one or more of the search results and a preceding search result. For these embodiments, the comparison of the hits of each of the one or more of the search results with hits of a preceding search result may include determining, by the content aggregator system 10, whether there are any hits of each of the one or more of the search results that are not found in a preceding search result. For example, determining whether the most recent search result includes hits (e.g., URLs) that are not found in an earlier generated search result. In the same or alternative embodiments, the comparison of the hits of each of the one or more search of the results with hits of a preceding search result may include determining, by the content aggregator system 10, whether content of any of the hits of each of the one or more of the search results changed based on a comparison to contents of hits of a preceding search result. For example, comparing the content of a hit (e.g., a website) found by an earlier search with the content of the same hit at a later point in time when a later search is conducted to determine whether the content (e.g., textual passage such as information related to a specific topic, statistical data, image data, etc.) for the same hit has changed between when the earlier search was conducted and the later search was conducted.

Returning to FIG. 2A, at 208 the one or more of search of the results are presented including identifying one or more differences between each of the one or more of the search results and a preceding search result if there are any differences. For example, the content aggregator system 10 presenting (e.g., transmitting or causing to display) the one or more of the search results including identifying one or more differences between each of the one or more of the search results and a preceding search result if there are any differences. For instance, suppose a search is repetitively performed and a comparison of two of the search results are made to identify the differences between the two search results. However, it may not be practical to find, much less identify, every difference between the two search results since there could be hundreds of hits (e.g., websites, online content, white papers, podcasts, etc.) that are found each time the repetitive search is performed. Thus, if no differences are detected between, for example, the top 100 hits from each of two search results, then no highlighting or indication of the differences may be provided when the later search result is presented to indicate the differences. However, if one or more differences are identified between the top 100 hits from each result, then the differences may be highlighted when the later search result is presented to indicate the differences between the two search results.

In various embodiments, the presentation of the one or more of the search results by the content aggregator system 10, may include presenting, for each of the one or more of the search results, access to representations of a plurality of hits of each of the one or more of the search results. For example, in the user interface 700 of FIG. 7 representations 704a, 704b, and 704c may be selected (e.g., clicked or tapped) by a user to access the hits represented by the representations 704a, 704b, and 704c. In some embodiments, the presentation of the one or more of the search results includes presenting, for a specific search result, access to representations of a subset of a plurality of hits of the specific search result, all hits of the subset of hits providing access to a particular type of content (e.g., webpage, white paper, video, information on meetups, information on experts, etc.). For example, through the left-side 720 of the user interface 700 of FIG. 7, one of the blocks 702* may be selected by a user to view and access representations of particular type of hit (e.g., if block 702c is selected, for example, only representations of papers that meet at least some of the search parameters may be displayed on the right-side 730, the representations may then be selected for accessing the corresponding papers).

In some embodiments, process 200 may include presenting a representation of a hit of a search result that includes an annotation provide by an administrator user 30. For example, when an administrator user 30 accesses, for example, the user interface 700 of FIG. 7, the administrator user 30 may annotate one or more of the representations 704* of the hits on the right-side 730 of the user interface 700. Such a user interface 700 may then be presented to the research user 20* via their user computing device 22*.

In some embodiments, the identification of the one or more differences between each of the one or more of the search results and a preceding search result if there are any differences includes presenting representations of hits of a search result and highlighting or tagging a representation of a hit that was not previously found in a preceding search result. For example, in FIG. 7 representation 704b is highlighted because the hit responding to representation 704b was not found in an earlier search. Note that rather than being highlighted, representation 704b could be tagged with a symbol or text or by other means that identifies the hit corresponding to representation 704b as not being previously identified in an earlier search.

In some embodiments, wherein the identification of the one or more differences between each of the one or more of the search results and a preceding search result includes separately presenting a representation of a hit that was not previously found in a preceding search result. For example, rather than merely highlighting representation 704b in the user interface 700 for example, presenting or displaying representation 704b in another window, or in another area of the user interface 700 reserved for, for example, new hits.

In various embodiments, the presentation of the one or more of the search results by the content aggregator system 10 includes presenting automatically, by the content aggregator system 10, a notification regarding presence of one or more difference between a current search result and a preceding search result in response, at least in part, to detecting changes to location of a computing device 22a (e.g., mobile computing device with a GPS) of a research user 20a. For example, when the research user 20a carrying her computing device 22 travels to new location that is beyond a predefined distance (e.g., 100 miles) away from the current location, the content aggregator system 10 may automatically run a new search even though it is not yet scheduled to run a search, and if one or more new hits are detected, a notification is sent to the computing device 22a to alert the user to the new hit. In some cases, the notification may only identify the new hit. In other cases, however, the notification may be provided in the form of a regular search result user interface such as the user interface 700 of FIG. 7 showing representation of hits and highlighting or tagging, for example, hits that are new or hits with new content.

In various embodiments, the presentation of the one or more of the search results includes presenting a representation of a hit of one of the one or more of the search results, the representation including an annotation provided by an administrator user 30. For example, the administrator user 30 providing their comments regarding a particular hit or adding a symbolic tag that has a specific meaning (e.g., a thumbs up or a thumbs down).

FIG. 2B is a flowchart of another example process 250 for repetitively performing a search using the same one or more search parameters according to various embodiments. In some embodiments, at least some of the operations illustrated in FIG. 2A may be performed by the content aggregator system 10 of FIGS. 1A and 1B. Note that process 250 includes all of the operations 202, 204. 206, and 208 of process 200 of FIG. 2A. In addition, process 250 includes an operation 203 for forming, by the content aggregator system 10, a search parameter set that defines one or more parameters for a search to be repetitively performed and saving the search parameter set (e.g., saving in, for example, a datastore 104). In some cases, the saved search parameter set may include one or more search parameters provided by an administrator user 30 and the search that is performed by, for example, the content aggregator system 10 is repetitively performed based, at least on the one or more search parameters provided by the administrator user 30.

In some embodiments, the search that is repetitively performed may be accomplished by filtering out hits that include one or more exclusion terms identified in the one or more search parameters provided by the administrator user 30. For example, if the topic for a search is covid-19 cures, then the exclusion term that may be provided by the administrator user 30 may be "disinfectant." In some embodiments, the saved search parameter set includes one or more search parameters provided by a user profile 108 and the search is repetitively performed based, at least on the one or more search parameters (e.g., grade, school, location, and so forth) provided by the user profile 108.

Referring to FIG. 3, which is a flowchart of an example process 300 for filtering out hits of a plurality of search results generated for a plurality of research users according to various embodiments. In some embodiments, at least some of the operations illustrated in FIG. 3 may be performed by the content aggregator system 10 of FIGS. 1A and 1B. In order to facilitate understanding of process 300, the following discussion of process 300 may reference the systems and features illustrated in FIGS. 1A, 1B, and 7. However, those of ordinary skill in the art will recognize that process 300 may be implemented using systems and features other than those illustrated in FIGS. 1A, 1B, and 7.

The example process 300 may begin at 302 when a plurality of search results of a plurality of research users are generated according to some embodiments. For example, the content aggregator system 10 generating a plurality of search results 110 of a plurality of research users 20*. For these embodiments the plurality of search results 110 may be generated in response to the content aggregator system 10 performing multiple searches repetitively for multiple research users 20* using, for each research user 20*, a search parameter set 106 that is specific for that research user 20*. For example, for each of the research user 20*, the content aggregator system 10 conducting a search repetitively using the same search parameter set 106 specific to that research user 20* to generate a plurality of search results 110 for each research user 20*.

At 304, one or more hits of at least a subset of the search results may be filtered out, the one or more hits to be filtered out being selected for filtering by an administrator user 30. For example, the content aggregator system 10 filtering out (e.g., deleted, removed, or tagged for exclusion or non-publication), one or more hits of at least a subset of the search results 110, the one or more hits to be filtered out being selected for filtering by an administrator user 30. That is, the administrator user 30 may, via their computing device 32, submit to the content aggregator system 10 a list of websites (including their URL), content authors, source types (e.g., blogs), exclusion terms, and so forth that the administrator user 30 wishes to filter out from the search results 110 generated by the content aggregator system 10. In some embodiments, the filtering out of the one or more hits from the at least the subset of the search results 110 may include adding to the at least the subset of the search results 110 annotations provided by the administrator 30 for one or more hits that appear in the at least the subset of the search results 110. For example, the administrator user 30 may direct the content aggregator system 10 to add the comments of administrator user 30 to representations of specific hits so that whenever representations of those specific hits appear in any presentation (e.g., user interface 700) of a search result 110, the comments of the administrator user 30 are also displayed through the presentation (e.g., user interface 700).

At 306 the at least a subset of the search results may be presented to computing devices of the research users. For example, the content aggregator system 10 presenting (e.g., transmitting) the at least a subset of the search results 110 that has been filtered to computing devices 22* of the research users 20*.

FIG. 4 is a flowchart of an example process 400 for repetitively performing a search using the same one or more search parameters and for filtering out hits of a plurality of search results generated for a plurality of research users according to various embodiments. In particular, process 400 is a process that combines the operations of process 200 of FIG. 2A and the operations of process 300 of FIG. 4. For example, operations 402, 404, 406, and 408 of process 400 of FIG. 4 mirrors operations 202, 204, 206, and 208, respectively of process 200 of FIG. 2A. Similarly, operations 412, 414, and 416 of process 400 essentially mirrors operations 302, 304, and 306 of process 300 of FIG. 3. As with the operations of processes 200 and 300, in various embodiments, the operations of process 400 may be performed by the content aggregator system 10 of FIGS. 1A and 1B.

Figure 5:
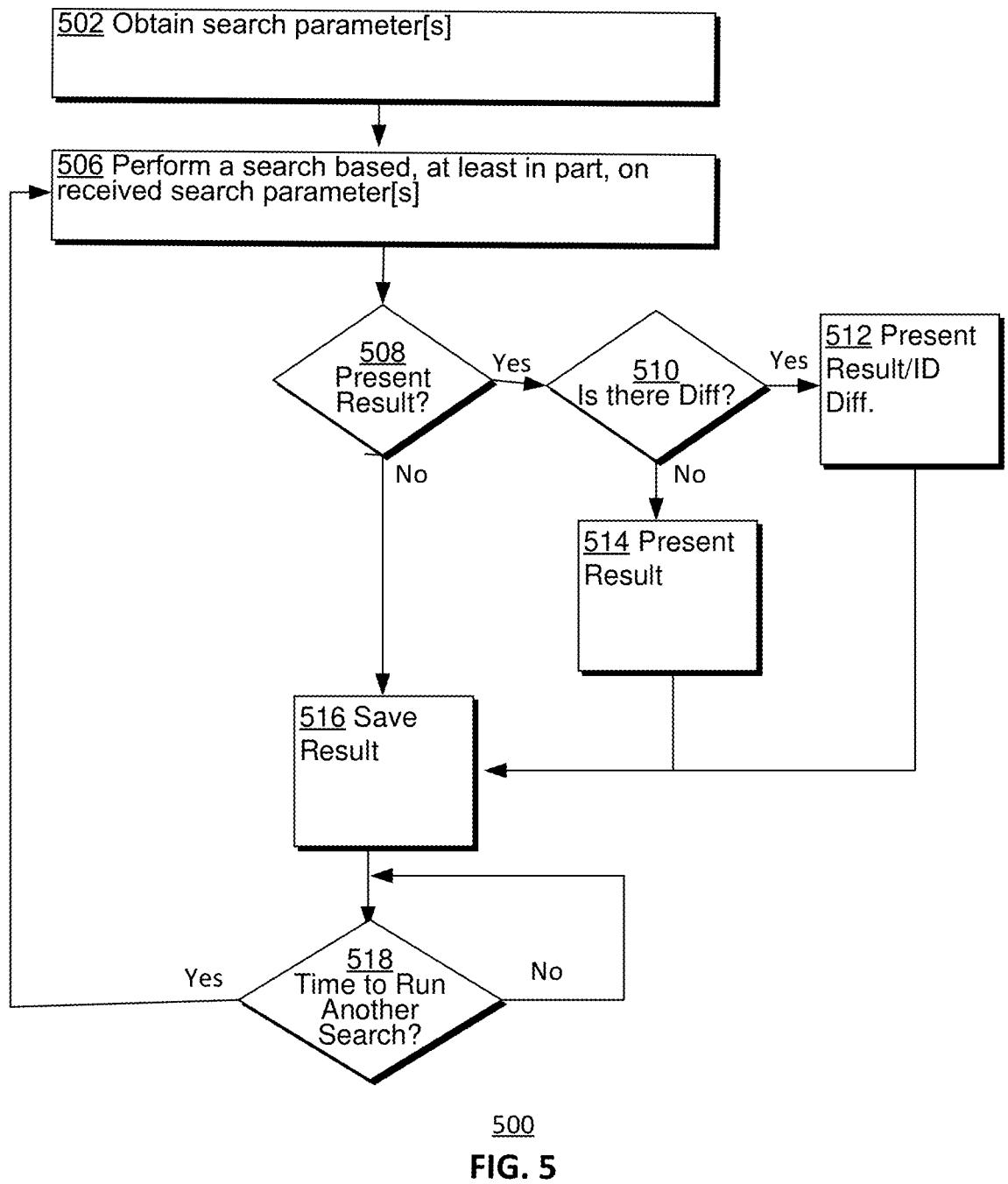
FIG. 5 is a flow chart of an example process for repetitively performing a search at different points in time based on the same one or more search parameters according to some embodiments

FIG. 5 is a flowchart of an example process 500 for repetitively performing a search at different points in time (e.g., at regular points in time, at specified points in time, and/or randomly) based on the same one or more search parameters according to various embodiments. In some embodiments, at least some of the operations illustrated in FIG. 5 may be performed by the content aggregator system 10 of FIGS. 1A and 1B. In order to facilitate understanding of process 500, the following discussion of process 500 may reference the systems and features illustrated in FIGS. 1A, 1B, and 7. However, those of ordinary skill in the art will recognize that process 500 may be implemented using systems and features other than those illustrated in FIGS. 1A, 1B, and 7.

In some embodiments, process 500 may begin when one or more search parameters are obtained. For example, the content aggregator system of FIGS. 1A and 1B obtaining one or more search parameters from, for example, a computing device 22* of a research user 20* (e.g., via search query), from a computing device 32 of an administrator user 30, and/or from a user profile 108 of the research user 20*. In some alternative embodiments, the one or more search parameters that are obtained may be in the form of a search parameter set 106, and obtaining the one or more search parameters may include retrieving the search parameter set from, for example, a datastore 104 or from another storage or memory device.

At 504 a search may be performed based, at least in part, on the obtained one or more search parameters. For example, the content aggregator system 10 performing an online search based, at least in part, on the obtained one or more search parameters. As a result, various data may be retrieved from, for example, the Internet during the search to identify hits (e.g., websites, online content, podcasts, etc.) including title, URL, and so forth that may meet the one or more search parameters.

At 506, a determination may be made as to whether the result of the search needs to or should be presented (e.g., transmitted or caused to be displayed the result). Such a determination may be based on a user (e.g., the research user 20* or administrator user 30) requesting access to the search result or at least part of the search result through their computing device 20* or 32. If a determination is, in fact, made that the search result is to be presented, then at 510 a determination is made as to whether there is a difference between the search result that was just generated (e.g., "current" result or search result) and a preceding or previous search result that was generated using the same one or more search parameters and which was previously saved. In some cases, such a determination may be made by comparing, for example, the top-most relevant hits (e.g., the top 50 most relevant hits, the top 100 most relevant hits, and so forth) of the current search result with the top-most relevant hits of the preceding search result. If a difference is detected, then at 512 the current result or at least part of the current result including indication of the difference or differences between the current search result and the preceding search result are presented (e.g., transmitted or caused to be displayed). In various embodiments, the difference or differences between the current search result and the preceding search result may be indicated in, for example, the presentation of the current search result. For example, by highlighting or tagging new hits or content, in the presentation of the current search result, or by explicitly and separately showing, for example, a new hit or content.

If no difference between the current search result and a preceding search result is determined at 510 then at 514 the current search result is presented. At 514, the current search result may be saved. For example, the current search result may be saved to a datastore 104 and/or to other memory or storage device. In some cases, if a difference is determined between the current search result and the preceding search result, then that difference may also be saved.

At 518, a determination is made as to whether it is time to run another search using the same one or more search parameters. The determination may be based a variety of factors. For example, in some cases, repetitive searches may be conducted at regular time intervals. Thus, if an internal clock indicates that sufficient time has lapsed, then at 518 a determination is made that another search needs to be conducted and the process 500 returns to operation 504. In other cases, rather than the search being repetitively conducted at regular time intervals, the repetitive search may be conducted at specified times. Alternatively, a determination made be made at 518 to conduct another search if it is determined, for example, that the computing device 22* (e.g., a mobile computing device with a GPS) has relocated to a new location or relocated at least a pre-defined distance away from the research user's home location or his or her most recent location. For example, if the research user 20* relocates at least a hundred miles away from her home location, a new search may be initiated.

In the case where the repetitive search is to be conducted repetitively only during the course of a specific time span (e.g., run for three months or end on December 31st), an additional decision diamond may be added to process 500. For example, in one embodiment, a decision diamond may be added between operation 516 and 518 to determine whether there is sufficient time to do another search, and if not, process 500 ends, otherwise process 500 will continue to operation 516.

Figure 6A:
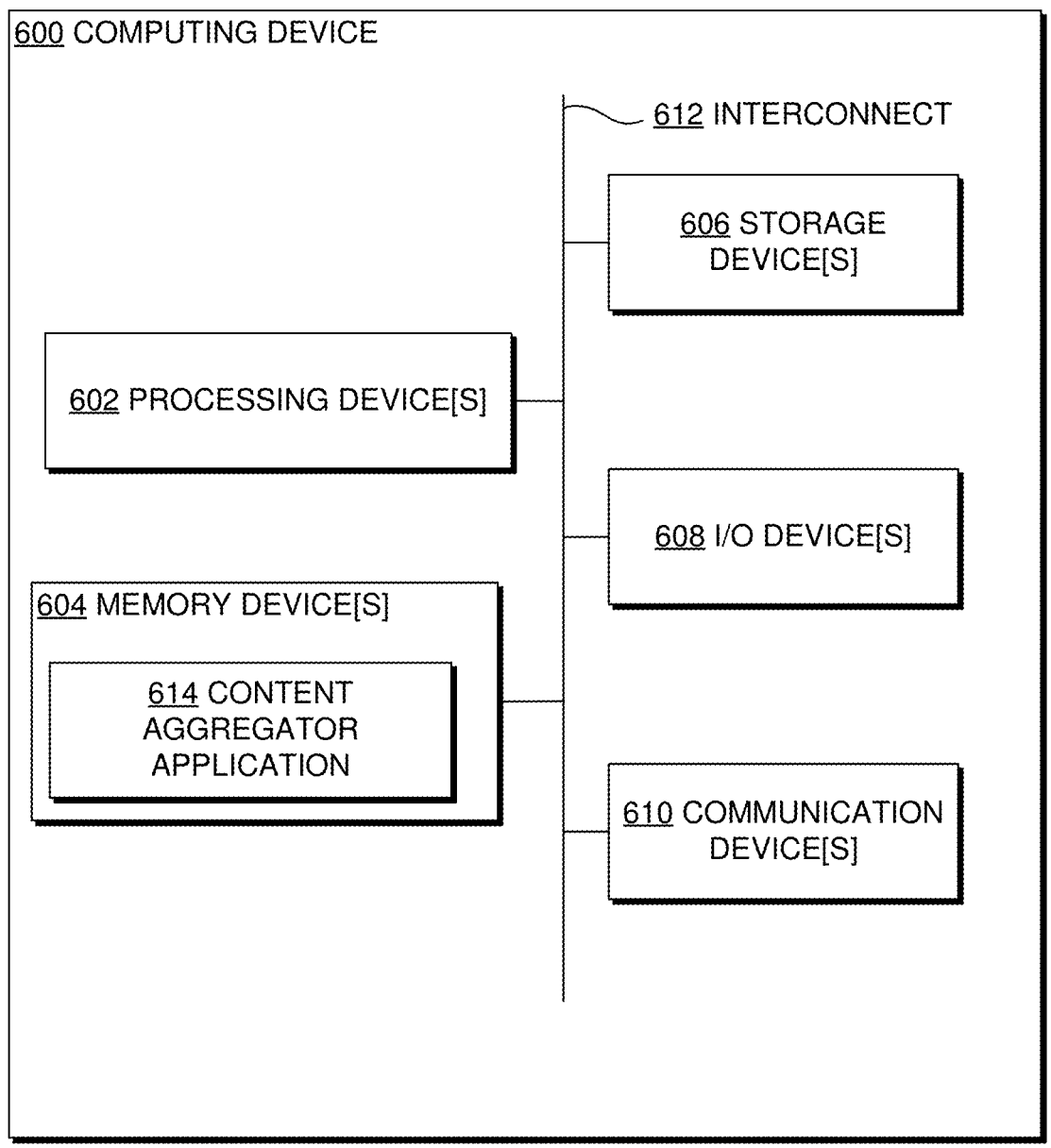
FIG. 6A is a high-level block diagram of an example computing device in accordance with some embodiments.

FIG. 6A is a high-level block diagram of an example computing device 600 in accordance with some example embodiments. In various embodiments, one or more of the computing devices 600 may be employed to implement the content aggregator system 10 of FIGS. 1A and 1B. More particularly, one or multiple instances of the computing devices 600 can be used to implement the technologies described herein, where multiple such instances can be coupled to each other via one or more networks.

As illustrated, the computing device 600 includes one or more processing devices 602, one or more memory devices 604, one or more storage devices 606, one or more input/output (I/O) devices 608, and one or more communication devices 610, all coupled together via an interconnect 612. The one or more memory devices 604 may store therein a content aggregator application 614 (e.g., computer readable instructions) for implementing the content aggregator system 10 described above as well as other applications such as, for example, an operating system (OS). That is, in various embodiments, the processes and logic flows described above can be performed by the one or more processing devices 602 executing one or more computer programs (e.g., content aggregator application 614). For example, when the content aggregator system 10 of FIGS. 1A and 1B is implemented at least partly via a computer program rather than via dedicated circuits such as ASIC for example, the computer program (e.g., content aggregator application 614), which may be loaded on the one or more memory devices 604, may be executed by the one or more processing devices 602 in order to execute the above-described techniques. Note that although not explicitly illustrated in FIG. 6, a persistent copy of the content aggregator application 614 may be stored in one or more storage devices 606.

The interconnect 612 may be or include one or more conductive traces, buses, point-to-point connections, controllers, adapters, and/or other connection devices. The one or more processing devices 602 may include, for example, one or more processors, digital signal processors (DSPs), controllers, field programmable gate array (FPGA), application specific integrated circuit (ASIC), or the like, or any combination thereof. The one or more memory devices 604 may include one or more physical storage devices, which may be in the form of random-access memory (RAM), Static RAM (SRAM), Dynamic RAM (DRAM), read-only memory (ROM), flash memory, or other suitable type of storage or memory device, or a combination of such devices. The one or more storage devices 606 may include one or more hard drives, solid-state drives, digital versatile disks (DVDs), flash memories, datastore, or the like. Each of the memory devices 604 and/or storage devices 606 may store, individually or collectively, data and instructions that configure the one or more processing devices 602 to execute operations to implement the processes and operations described above.

The one or more communication devices 610 may include, for example, a network interface card (NIC), an Ethernet adapter, cable modem, Wi-Fi adapter, cellular transceiver, baseband processor, or the like, or a combination thereof. The one or more I/O devices 608 may include, for example, a display (which may be a touch screen display), audio speaker, keyboard, mouse, or other pointing device, microphone, camera, and so forth. Note that such I/O devices 608 may not be necessary if the computing device 600 is a server computer.

Figure 6B:
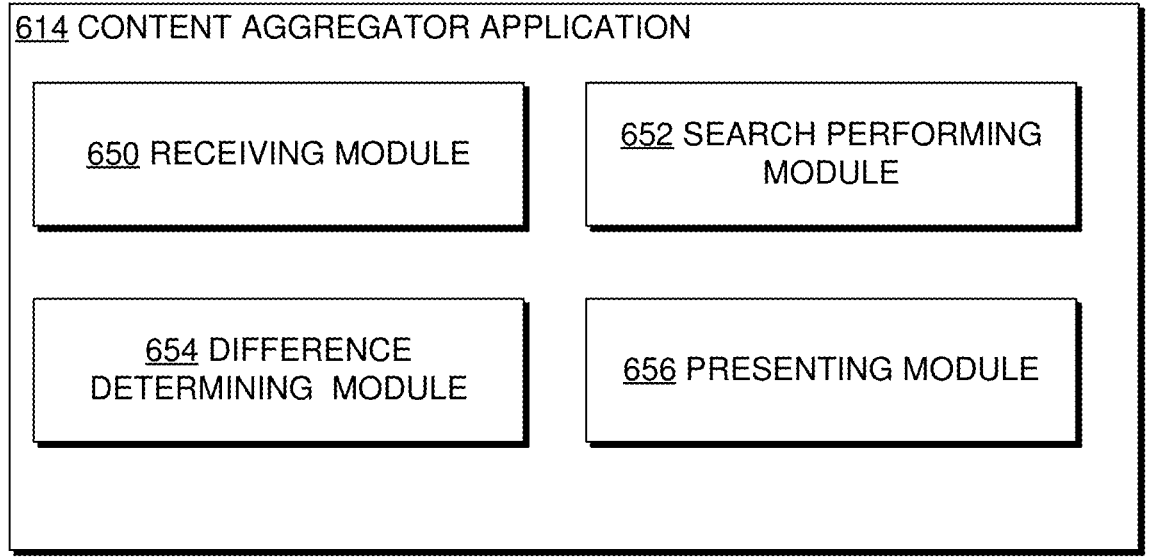
FIG. 6B is a block diagram of a content aggregator application illustrated in FIG. 6A according to some embodiments.

FIG. 6B is a block diagram of the content aggregator application 614 of FIG. 6A according to some embodiments. For these embodiments, the content aggregator application 614 may include one or more modules (e.g., each module may be a software component or part of a program that may contain one or more routines) that when implemented by one or more processing devices 602 may perform the various operations and processes described above. For example, the content aggregator application 614 may include a receiving module 650, a search performing module 652, a difference determining module 654, and a presenting module 656, among other things. These modules, when executed by, for example the one or processing devices 602 of FIG. 6A, may be designed to perform the various operations of processes 200 and 250 of FIGS. 2A and 2B.

For example, the receiving module 650 when implemented by the one or more processing devices 602 (e.g., one or more microprocessors) may be designed to receive a search query that includes one or more search parameters including one or more search terms. In some cases, the receiving module 650, when implemented by one or more processing devices 602, may be designed to form a search parameter set that defines one or more parameters for the search to be repetitively performed and saving the search parameter set. In contrast, the search performing module 652 when implemented by the one or more processing devices 602 may be designed to repetitively perform a search to produce a plurality of search results at different points in time, each performed search being based, at least in part, on the one or more search parameters included in the search query. For these embodiments, the difference determining module 654 when implemented by the one or more processing devices 602 may be designed to, among other things, determine for one or more of the search results whether there is a difference between each of the one or more of the search results and a preceding search result. When the one or more processing devices 602 implements the presenting module 656, the presenting module 656 may be designed to, among other things, present (e.g., transmit or cause to be displayed) the one or more of the search results including identifying one or more differences between each of the one or more of the search results and a preceding search result if there are any differences.

After reviewing the present disclosure, an individual of ordinary skill in the art will immediately appreciate that some details and features can be added, removed and/or changed without deviating from the spirit of the invention. Reference throughout this specification to "one embodiment," "an embodiment," "additional embodiment(s)" or "some embodiments," means that a particular feature, structure or characteristic described in connection with the embodiment(s) is included in at least one or some embodiment(s), but not necessarily all embodiments, such that the references do not necessarily refer to the same embodiment (s). Furthermore, the particular features, steps, structures, or characteristics may be combined in any suitable manner in one or more embodiments. These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled.

What is claimed is:

1. A computer-implemented method, comprising
    receiving a search query that includes one or more search parameters including one or more search terms;
    performing repetitively a search to produce a plurality of search results at different points in time, each performed search being based, at least in part, on the one or more search parameters included in the search query;
    determining for one or more of the search results whether there is a difference between each of the one or more of the search results and a preceding search result; and
    presenting the one or more of the search results including identifying one or more differences between each of the one or more of the search results and a preceding search result if there are any differences.

2. The computer-implemented method of claim 1, wherein the search query indicates when repetitive performances of the search is to be completed.

3. The computer-implemented method of claim 1, wherein the search query is provided by a research user via a first computing device and wherein the search that is repetitively performed is based, at least in part, on one or more search parameters provided by an administrator user via a second computing device.

4. The computer-implemented method of claim 3, wherein the search that is repetitively performed is based, at least in part, on a user profile of the research user.

5. The computer-implemented method of claim 1, wherein the search that is repetitively performed is by repetitively performing a search using a plurality of search engines.

6. The computer-implemented method of claim 1, wherein the search that is repetitively performed is performed at predefined time intervals or at specified times.

7. The computer-implemented method of claim 1, wherein the search that is repetitively performed is repetitively performed within a predefined time span.

8. The computer-implemented method of claim 1, wherein the search query is provided by a research user, and one or more of the searches that are performed are initiated based on detected location of a computing device associated with the research user.

9. The computer-implemented method of claim 8, wherein the one or more of the searches that are performed are initiated in response to a determination that the computing device has relocated beyond a predefined distance from a previous location of the computing device.

10. The computer-implemented method of claim 1, wherein performing repetitively, by the content aggregator system, a search to produce the plurality of search results at different points in time includes storing the plurality of search results.

11. The computer-implemented method of claim 1, wherein determining whether there is a difference between each of the one or more of the search results and a preceding search result comprises determining whether there is a difference between a search result and an immediately preceding search result.

12. The computer-implemented method of claim 1, wherein each of the one or more of the search results include information identifying a plurality of hits that at least partly meets the one or more search parameters of the search query.

13. The computer-implemented method of claim 12, wherein the hits are ranked according to one or more relevancy factors including content match relevancy, temporal relevancy, search engine rankings, prestige/source reliability, content author relevancy, and/or user preferences.

14. The computer-implemented method of claim 12, wherein each of the one or more of the search results include information that indicates at least a title and a uniform resource locator (URL) for each of the hits identified by each of the one or more of the search results.

15. The computer-implemented method of claim 12, wherein determining whether there is a difference between each of the one or more of the search results and a preceding search result includes comparing the hits of each of the one or more of the search results with the hits of a preceding search result to determine whether there is a difference between one of the one or more of the search results and a preceding search result.

16. The computer-implemented method of claim 15, wherein comparing the hits of each of the one or more of the search results with hits of a preceding search result includes determining whether there are any hits of each of the one or more of the search results that are not found in a preceding search result.

17. The computer-implemented method of claim 16, wherein comparing the hits of each of the one or more search results with hits of a preceding search result includes determining whether content of any of the hits of each of the one or more of the search results changed based on a comparison to contents of hits of a preceding search result.

18. The computer-implemented method of claim 1, wherein presenting the one or more of the search results includes presenting, for each of the one or more of the search results, access to representations of a plurality of hits of each of the one or more of the search results.

19. The computer-implemented method of claim 18, wherein presenting the one or more of the search results includes presenting, for a specific search result, access to representations of a subset of a plurality of hits of the specific search result, all hits of the subset of hits providing access to a particular type of content.

20. The computer-implemented method of claim 18, further comprising presenting a representation of a hit of a search result that includes an annotation provided by an administrator user.

21. The computer-implemented method of claim 18, wherein identifying the one or more differences between each of the one or more of the search results and a preceding search result if there are any differences includes presenting representations of hits of a search result and highlighting or tagging a representation of a hit that was not previously found in a preceding search result.

22. The computer-implemented method of claim 18, wherein identifying the one or more differences between each of the one or more of the search results and a preceding search result includes separately presenting a representation of a hit that was not previously found in a preceding search result.

23. The computer-implemented method of claim 1, wherein presenting the one or more of the search results includes presenting automatically a notification regarding presence of one or more difference between a current search result and a preceding search result in response, at least in part, to detecting changes to location of a computing device of a research user.

24. The computer-implemented method of claim 1, wherein presenting the one or more of the search results includes presenting a representation of a hit of one of the one or more of the search results, the representation including an annotation provided by an administrator user.

25. The computer-implemented method of claim 1, further comprising forming a search parameter set that defines one or more parameters for the search to be repetitively performed and saving the search parameter set.

26. The computer-implemented method of claim 25, wherein the saved search parameter set includes one or more search parameters provided by an administrator user and the search is repetitively performed based, at least on the one or more search parameters provided by the administrator user.

27. The computer-implemented method of claim 26, wherein the search is repetitively performed by filtering out hits that include one or more exclusion terms identified in the one or more search parameters provided by the administrator user.

28. The computer-implemented method of claim 25, wherein the saved search parameter set includes one or more search parameters provided by a user profile and the search is repetitively performed based, at least on the one or more search parameters provided by the user profile.

29. The computer-implemented method of claim 1, further comprising:
   generating, by the content aggregator system, a plurality of additional search results of a plurality of research users;
   filtering out, by the content aggregator system, one or more hits of at least a subset of the additional search results, the one or more hits to be filtered out being selected for filtering by an administrator user; and
   presenting, by the content aggregator system, the at least a subset of the additional search results to computing devices of the research users.

30. One or more non-transitory computer-readable storage media including instructions that, when executed by one or more processors, cause the one or more processors perform the steps of:
   receive a search query that includes one or more search parameters including one or more search terms;
   perform repetitively a search to produce a plurality of search results at different points in time, each performed search being based, at least in part, on the one or more search parameters included in the search query;
   determine for one or more of the search results whether there is a difference between each of the one or more of the search results and a preceding search result; and
   present the one or more of the search results including identifying one or more differences between each of the one or more of the search results and a preceding search result if there are any differences.

31. A computing device, comprising:
   one or more processors; and
   memory containing instructions that, when executed by the one or more processors, cause the computing device to:

receive a search query that includes one or more search parameters including one or more search terms;

perform repetitively a search to produce a plurality of search results at different points in time, each performed search being based, at least in part, on the one or more search parameters included in the search query;

determine for one or more of the search results whether there is a difference between each of the one or more of the search results and a preceding search result; and present the one or more of the search results including identifying one or more differences between each of the one or more of the search results and a preceding search result if there are any differences.

* * * * *